US010109145B2

(12) United States Patent
Kernick et al.

(10) Patent No.: US 10,109,145 B2
(45) Date of Patent: Oct. 23, 2018

(54) APPARATUS AND METHOD FOR DISTRIBUTING OPHTHALMIC LENSES

(75) Inventors: Edward R. Kernick, Jacksonville, FL (US); Hamid A. Darabi, Ponte Vedra, FL (US); Daniel T. Wang, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 491 days.

(21) Appl. No.: 12/639,291

(22) Filed: Dec. 16, 2009

(65) Prior Publication Data

US 2010/0187249 A1 Jul. 29, 2010

Related U.S. Application Data

(60) Provisional application No. 61/171,593, filed on Apr. 22, 2009, provisional application No. 61/141,714, filed on Dec. 31, 2008.

(51) Int. Cl.

| | |
|---|---|
| ***B65D 83/00*** | (2006.01) |
| ***B65G 47/34*** | (2006.01) |
| ***G07F 11/68*** | (2006.01) |
| ***G07F 11/54*** | (2006.01) |
| ***G07F 17/00*** | (2006.01) |
| ***G07F 17/02*** | (2006.01) |

(52) U.S. Cl.

CPC .............. *G07F 11/68* (2013.01); *G07F 11/54* (2013.01); *G07F 17/0092* (2013.01); *G07F 17/02* (2013.01)

(58) Field of Classification Search

CPC ...... G07F 11/68; G07F 11/54; G07F 17/0092; G07F 17/02

USPC .................................................... 221/120, 84

See application file for complete search history.

(56) References Cited

U.S. PATENT DOCUMENTS

| | | | | |
|---|---|---|---|---|
| 2,932,383 A | | 4/1960 | Fagan | |
| 3,130,823 A | | 4/1964 | Antonious | |
| 3,260,404 A | * | 7/1966 | Critchell | 221/13 |
| 3,929,254 A | | 12/1975 | Artze | |
| 4,150,744 A | | 4/1979 | Fennimore | |
| 4,597,244 A | | 7/1986 | Pharo | |
| 4,691,820 A | * | 9/1987 | Martinez | B65D 75/326 206/205 |
| 4,765,482 A | | 8/1988 | Delia | |
| 4,772,143 A | * | 9/1988 | Craft | B41J 32/00 400/208 |
| 4,791,411 A | | 12/1988 | Staar | |
| 4,847,764 A | | 7/1989 | Halvorson et al. | |
| 4,865,186 A | | 9/1989 | Gates | |
| 4,909,382 A | | 3/1990 | Cuppari | |

(Continued)

FOREIGN PATENT DOCUMENTS

| | | |
|---|---|---|
| EP | 0223581 A2 | 5/1987 |
| EP | 0389418 A1 | 9/1990 |

(Continued)

OTHER PUBLICATIONS

International Search Report PCT/US2009/068200 dated Mar. 19, 2010.

(Continued)

*Primary Examiner* — Michael Collins

(57) ABSTRACT

An apparatus for dispensing ophthalmic lens packages having a pushing means and methods of its use are described herein.

7 Claims, 5 Drawing Sheets

(56) References Cited

U.S. PATENT DOCUMENTS

| | | | | |
|---|---|---|---|---|
| 4,958,280 | A | 9/1990 | Pauly et al. | |
| 4,985,280 | A | 1/1991 | Scholz et al. | |
| 5,014,875 | A | 5/1991 | McLaughlin et al. | |
| 5,054,610 | A | 10/1991 | Ajello | |
| 5,168,445 | A | 12/1992 | Kawashima et al. | |
| 5,179,408 | A * | 1/1993 | Walowit | G03B 27/588 355/407 |
| 5,271,703 | A | 12/1993 | Lindqvist et al. | |
| 5,337,888 | A | 8/1994 | Morrison | |
| 5,375,698 | A | 12/1994 | Ewart et al. | |
| 5,379,229 | A | 1/1995 | Parsons et al. | |
| 5,409,104 | A | 4/1995 | Lovell | |
| 5,433,314 | A | 7/1995 | Lin | |
| 5,460,294 | A | 10/1995 | Williams | |
| 5,467,868 | A | 11/1995 | Abrams et al. | |
| 5,468,110 | A | 11/1995 | McDonald et al. | |
| 5,515,964 | A | 5/1996 | Bauman | |
| 5,573,108 | A | 11/1996 | Hamilton et al. | |
| 5,593,267 | A | 1/1997 | McDonald et al. | |
| 5,609,246 | A | 3/1997 | Borghorst et al. | |
| 5,620,087 | A | 4/1997 | Martin et al. | |
| 5,653,844 | A | 8/1997 | Abrams | |
| 5,656,362 | A | 8/1997 | Abrams | |
| 5,694,551 | A | 12/1997 | Doyle et al. | |
| 5,695,049 | A | 12/1997 | Bauman | |
| 5,697,495 | A | 12/1997 | Abrams et al. | |
| 5,704,468 | A | 1/1998 | Lust et al. | |
| 5,710,302 | A | 1/1998 | Kunzler et al. | |
| 5,711,416 | A | 1/1998 | Bauman | |
| 5,720,157 | A | 2/1998 | Ross | |
| 5,722,536 | A | 3/1998 | Pierce et al. | |
| 5,760,100 | A | 6/1998 | Nicolson et al. | |
| 5,776,999 | A | 7/1998 | Nicolson et al. | |
| 5,789,461 | A | 8/1998 | Nicolson et al. | |
| 5,823,327 | A | 10/1998 | Wu et al. | |
| 5,839,587 | A | 11/1998 | Gress et al. | |
| 5,849,811 | A | 12/1998 | Nicolson et al. | |
| 5,908,527 | A | 6/1999 | Abrams | |
| 5,915,545 | A | 6/1999 | Shackel et al. | |
| 5,965,631 | A | 10/1999 | Nicolson | |
| 5,983,608 | A | 11/1999 | Wu et al. | |
| 5,993,755 | A | 11/1999 | Andersen | |
| 5,998,498 | A | 12/1999 | Vanderlaan et al. | |
| 6,003,006 | A | 12/1999 | Colella et al. | |
| 6,021,283 | A * | 2/2000 | Yoshida | G03B 1/60 396/408 |
| 6,029,808 | A | 4/2000 | Peck et al. | |
| 6,044,966 | A | 4/2000 | Haase | |
| 6,047,938 | A | 4/2000 | Mitchell | |
| 6,087,415 | A | 7/2000 | Vanderlaan et al. | |
| 6,090,471 | A | 7/2000 | Abrams | |
| 6,155,485 | A | 12/2000 | Coughlin et al. | |
| 6,161,696 | A | 12/2000 | Lashley | |
| 6,164,452 | A | 12/2000 | Ellis | |
| 6,208,908 | B1 | 3/2001 | Boyd et al. | |
| 6,223,934 | B1 | 5/2001 | Shoenfeld | |
| 6,244,430 | B1 | 6/2001 | Travis | |
| 6,253,912 | B1 | 7/2001 | O'Neill et al. | |
| 6,314,337 | B1 | 11/2001 | Marcum | |
| D458,023 | S | 6/2002 | Dzwill et al. | |
| 6,401,915 | B1 | 6/2002 | Faxe | |
| 6,474,465 | B1 | 11/2002 | Jux | |
| 6,493,427 | B1 | 12/2002 | Kobylevsky et al. | |
| 6,499,843 | B1 | 12/2002 | Cox et al. | |
| 6,522,939 | B1 | 2/2003 | Strauch et al. | |
| 6,882,982 | B2 | 4/2005 | McMenimen et al. | |
| 6,910,601 | B2 | 6/2005 | Thomas et al. | |
| 6,925,447 | B2 | 8/2005 | McMenimen et al. | |
| 6,973,435 | B1 | 12/2005 | Sioufi et al. | |
| 7,072,737 | B2 | 7/2006 | Lunak et al. | |
| 7,086,526 | B2 | 8/2006 | Newman | |
| 7,117,170 | B1 | 10/2006 | Bennett et al. | |
| 7,194,333 | B2 | 3/2007 | Shoenfeld | |
| 7,963,201 | B2 * | 6/2011 | Willoughby et al. | 83/210 |
| 8,392,018 | B2 * | 3/2013 | Wang | G07F 11/54 700/231 |
| 2001/0017271 | A1 | 8/2001 | Yavitz | |
| 2002/0026768 | A1 * | 3/2002 | Duncan | B65B 25/008 53/52 |
| 2002/0032620 | A1 | 3/2002 | Benz et al. | |
| 2002/0046130 | A1 | 4/2002 | Monteleone et al. | |
| 2002/0063068 | A1 | 5/2002 | Faxe et al. | |
| 2002/0117405 | A1 * | 8/2002 | Wang | B65B 25/008 206/5.1 |
| 2002/0128957 | A1 | 9/2002 | Rosenberg et al. | |
| 2002/0175177 | A1 | 11/2002 | Jepson | |
| 2002/0197478 | A1 | 12/2002 | Muggli et al. | |
| 2003/0007123 | A1 | 1/2003 | Broderick et al. | |
| 2003/0093328 | A1 | 5/2003 | Koons | |
| 2003/0225478 | A1 | 12/2003 | Kobayashi | |
| 2004/0004008 | A1 | 1/2004 | Peck et al. | |
| 2004/0015412 | A1 | 1/2004 | Shinbo | |
| 2004/0030617 | A1 | 2/2004 | Shinbo | |
| 2004/0039482 | A1 | 2/2004 | Thomas et al. | |
| 2004/0158350 | A1 * | 8/2004 | Ostergaard | A61J 7/0481 700/231 |
| 2004/0176977 | A1 | 9/2004 | Broderick et al. | |
| 2004/0215525 | A1 | 10/2004 | Keane et al. | |
| 2004/0236607 | A1 | 11/2004 | Kost et al. | |
| 2004/0238380 | A1 | 12/2004 | Newman | |
| 2005/0060196 | A1 | 3/2005 | Tsushi et al. | |
| 2005/0122472 | A1 | 6/2005 | Fisher et al. | |
| 2005/0160009 | A1 | 7/2005 | Tanaka et al. | |
| 2006/0118229 | A1 * | 6/2006 | Ohashi | G06K 19/077 156/60 |
| 2006/0124656 | A1 | 6/2006 | Popovich, Jr. et al. | |
| 2006/0126015 | A1 | 6/2006 | Legerton et al. | |
| 2006/0161296 | A1 | 7/2006 | Shoenfeld | |
| 2008/0023345 | A1 | 1/2008 | Tokarski et al. | |
| 2010/0033678 | A1 | 2/2010 | Foster | |
| 2010/0181332 | A1 * | 7/2010 | Wang | G07F 11/54 221/1 |
| 2011/0054927 | A1 * | 3/2011 | Renna et al. | 705/2 |
| 2012/0016515 | A1 | 1/2012 | Pfeiffer et al. | |

FOREIGN PATENT DOCUMENTS

| | | | |
|---|---|---|---|
| EP | 0406161 | A2 | 1/1991 |
| EP | 406161 | B1 | 2/1995 |
| EP | 0299690 | B1 | 9/1996 |
| EP | 0734957 | A1 | 10/1996 |
| EP | 0995688 | A1 | 4/2000 |
| EP | 406161 | B1 | 1/2001 |
| EP | 1092645 | A1 | 4/2001 |
| EP | 1125849 | A2 | 8/2001 |
| EP | 1277416 | A2 | 1/2003 |
| EP | 1355250 | A2 | 10/2003 |
| EP | 1540537 | A2 | 6/2005 |
| GB | 884314 | A | 12/1961 |
| GB | 1311091 | A | 3/1973 |
| GB | 2328924 | A | 3/1999 |
| JP | S5310241 | A | 1/1978 |
| JP | S6417654 | A | 1/1989 |
| JP | H10313928 | A | 12/1998 |
| JP | H11232328 | A | 8/1999 |
| JP | 00/16905 | A | 1/2000 |
| JP | 2000-016905 | | 1/2000 |
| JP | 2001256304 | A | 9/2001 |
| JP | 2001305495 | A | 10/2001 |
| JP | 2001325337 | A | 11/2001 |
| JP | 2002078681 | A | 3/2002 |
| JP | 2002170008 | A | 6/2002 |
| JP | 2002258222 | A | 9/2002 |
| JP | 2003132096 | A | 5/2003 |
| JP | 2003162646 | A | 6/2003 |
| JP | 2003329983 | A | 11/2003 |
| JP | 2008090472 | A | 4/2008 |
| WO | WO-9104283 | A1 | 4/1991 |
| WO | WO 94/21698 | A1 | 9/1994 |
| WO | WO-9718997 | A1 | 5/1997 |
| WO | WO-9729441 | A1 | 8/1997 |
| WO | WO-0022560 | A2 | 4/2000 |

(56) References Cited

FOREIGN PATENT DOCUMENTS

| | | | |
|---|---|---|---|
| WO | WO-0022560 | A3 | 7/2000 |
| WO | WO-0076881 | A1 | 12/2000 |
| WO | WO-0022560 | A9 | 7/2001 |
| WO | WO-02071282 | A1 | 9/2002 |
| WO | WO 03/016175 | A1 | 2/2003 |
| WO | WO 03/16175 | A1 | 2/2003 |
| WO | WO-03017058 | A2 | 2/2003 |
| WO | WO-2004017156 | A2 | 2/2004 |
| WO | WO-2004024573 | A2 | 3/2004 |
| WO | WO-2004026566 | A1 | 4/2004 |
| WO | WO-2004024573 | A3 | 5/2004 |
| WO | WO-2005025991 | A2 | 3/2005 |
| WO | WO 05/82721 | A2 | 9/2005 |
| WO | WO 05/082721 | A2 | 9/2005 |
| WO | WO-2006060448 | A2 | 6/2006 |
| WO | WO 06/095172 | A | 9/2006 |

OTHER PUBLICATIONS

U.S. Appl. No. 61/141,714, Edward R. Kernick, filed Dec. 31, 2008.

U.S. Appl. No. 61/171,593, Daniel T. Wang, filed Apr. 22, 2009.

Innovative Kiosk Turnkey Solution for Automated inventory Management Delivers Results, Case Studies, CooperVision Incorporated, Feb. 12, 2009, Retrieved from the Internet: URL: Http:// http://www.ultimatetechnology.com/news-events-case-studies-details.php?id-=14>.

International Preliminary Report on Patentability for Application No. PCT/US2009/68211, dated Jul. 5, 2011, 8 pages.

International Search Report and Written Opinion for Application No. PCT/US2010/045686, dated Jul. 23, 2013, 7 Pages.

International Search Report for Application No. PCT/US2009/68211, dated May 11, 2010, 6 pages.

International preliminary report on Patentability for Application No. PCT/US2009/068200, dated Jul. 5, 2011, 6 pages.

International preliminary report on Patentability for Application No. PCT/US2010/045686, dated Aug. 13, 2013, 5 pages.

Written Opinion for Application No. PCT/US2009/068200, dated Mar. 19, 2010, 6 pages.

Written Opinion for Application No. PCT/US2009/68211, dated May 11, 2010, 7 pages.

* cited by examiner

APPARATUS AND METHOD FOR DISTRIBUTING OPHTHALMIC LENSES

RELATED APPLICATIONS

This application claims the benefit of provisional applications, U.S. Ser. No. 61/171,593 filed on Apr. 22, 2009 and U.S. Ser. No. 61/141,714, filed on Dec. 31, 2008.

This invention relates to an apparatus for automatically loading, dispensing, and taking inventory of ophthalmic lenses.

BACKGROUND

Due to advances in the design and cosmetic appearance of ophthalmic lenses the dispensers of such lenses need to maintain a large stock of such lenses to fit patients. In the trade theses lenses are commonly known as diagnostic lenses. For example when a patient suffers from astigmatism, an individual ophthalmologist may need to try several different prescriptions on a patient before the appropriate degree of vision correction is found. Given that space is limited in most dispenser's offices, maintaining sufficient quantities of different prescriptions is an administrative and logistical problem. Therefore it would be beneficial to have an apparatus that loads, stores, dispenses, keeps an inventory of a variety of different diagnostic lenses. This need is met by the following invention.

BRIEF DESCRIPTION OF THE DRAWINGS

FIG. 1 Perspective view of an apparatus of the

DETAILED DESCRIPTION OF THE INVENTION

This invention includes an apparatus for storing, and dispensing packages comprising

- a cartridge comprising a back wall and two side walls
  - wherein said cartridge is sized to hold a package
  - wherein said back wall comprises a hole
  - wherein said side walls are substantially parallel to each other and are attached substantially perpendicular to said back wall
  - wherein each of said side walls comprises a means for releasably holding the package in said cartridge
- a first spool and a second spool
  - wherein said first spool and said second spool are rotatably mounted to a least one support
  - wherein said first spool rotates about a first axis with one degree of freedom and said second spool rotates about a second axis with one degree of freedom
  - wherein said first axis and second axis are spaced a distance apart and are substantially co-planar
  - wherein the rotation of each of said spools can be independently or dependently controlled by one or more rotator means
- a flexible sheet having a width, a height, a first end, a second end, and a hole

- wherein the first end is attached along its height to the first spool and the second end is attached along its height to the second spool
  - wherein when said second spool or said first spool rotate, said flexible sheet coils or uncoils around said spools in response to their rotation
  - wherein the back wall of said cartridge is attached to said flexible sheet, and the hole of the flexible sheet and the hole of the cartridge are aligned to permit an object to pass therethrough
- a pushing means, wherein said pushing means moves in response to an electrical or mechanical signal, between said first spool and said second spool
  - wherein said pushing means extends a pushing member through the hole of the flexible sheet and the hole in the back wall of the cartridge in response to an electrical or mechanical signal
- a scanning means, wherein said scanning means moves in response to an electrical or mechanical signal between said first spool and said second spool.

Figure 1:
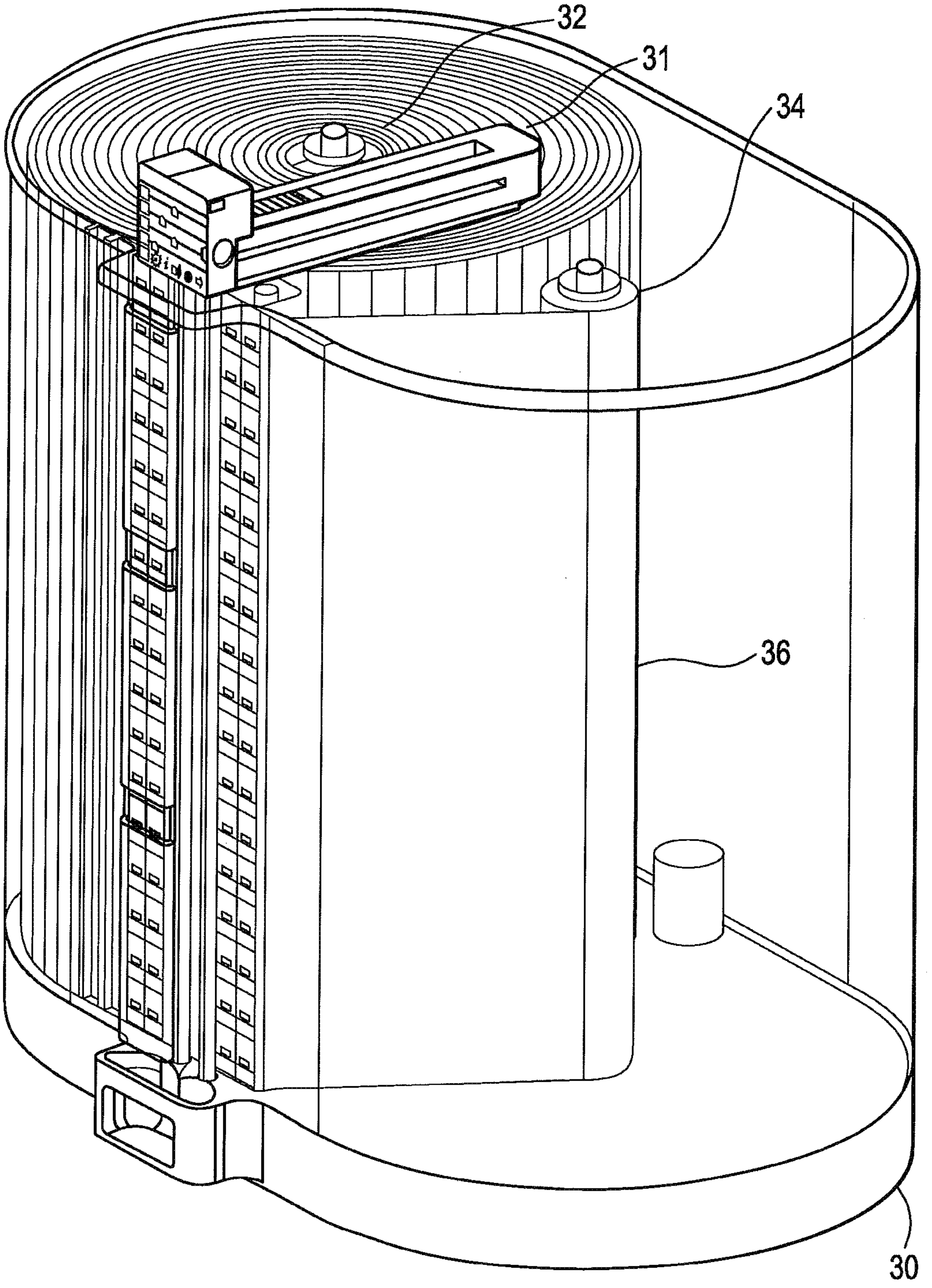
Figure 2:
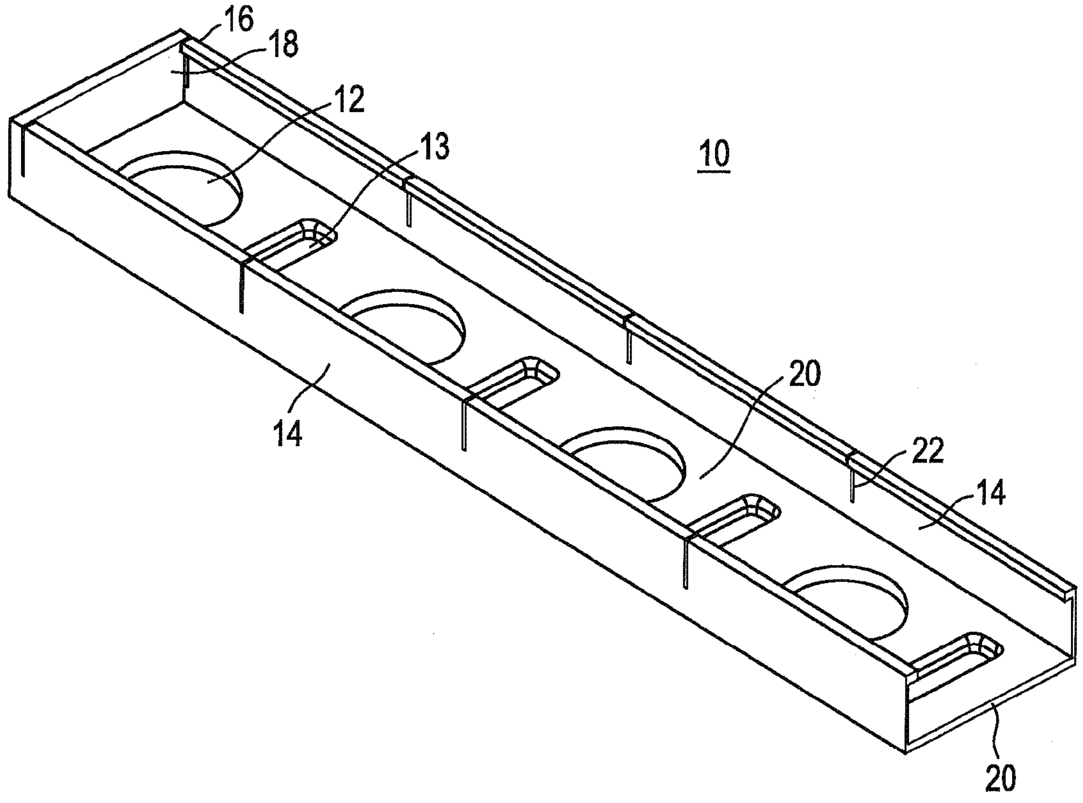
FIG. 2 Perspective view of a cartridge
Figure 3:
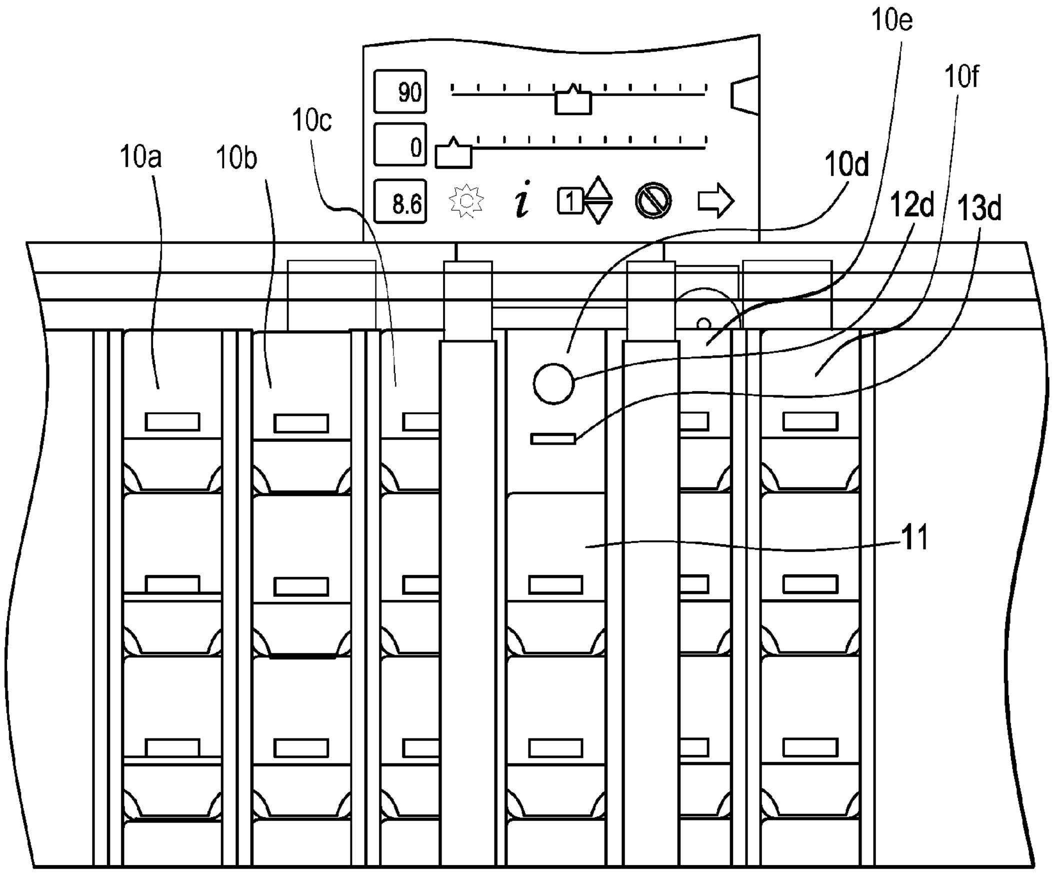
FIG. 3 Front plan view of a plurality of attached cartridges.
Figure 4:
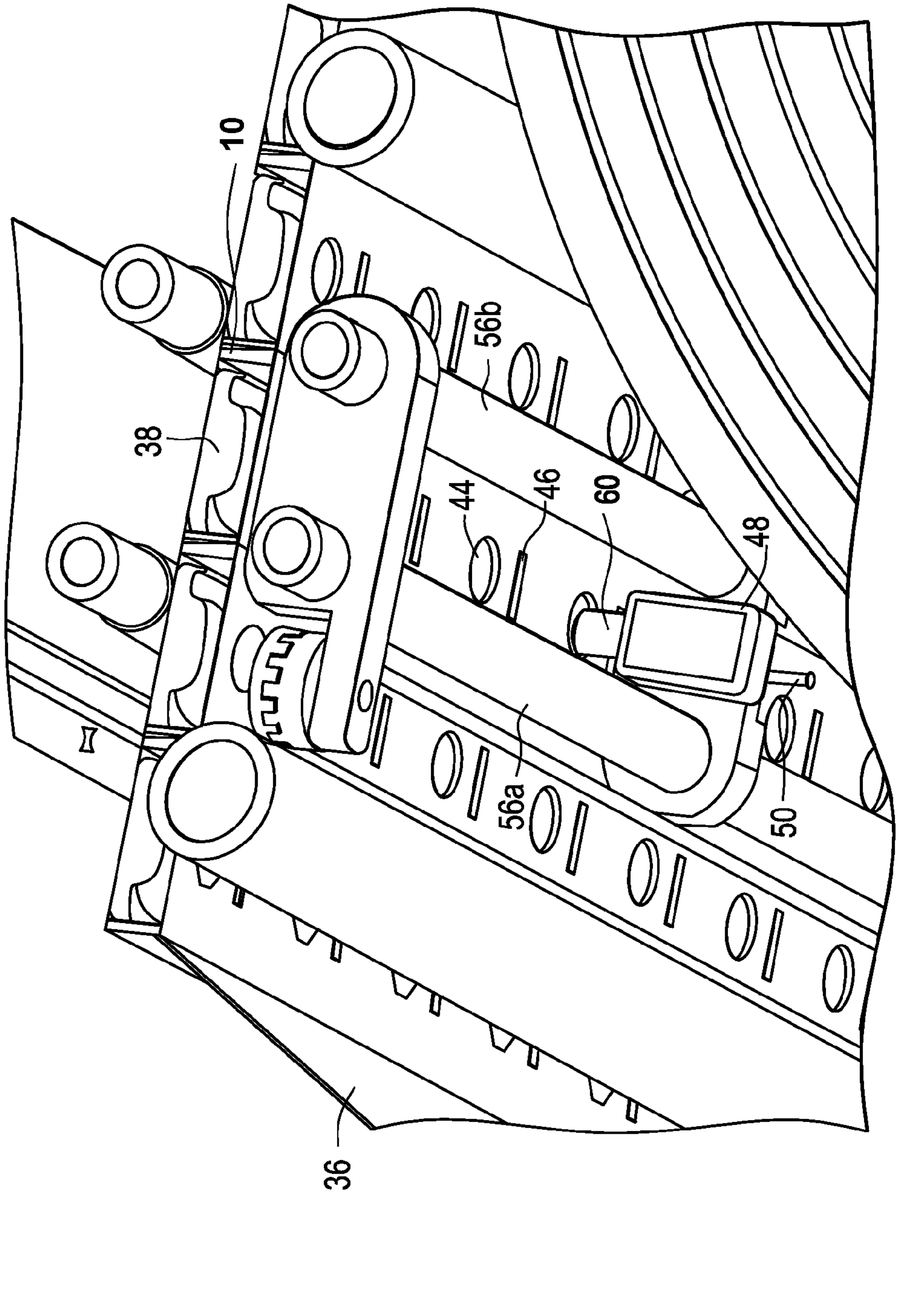
FIG. 4 Perspective view of the pusher and the flexible sheet

The invention is further described in further detail in reference to the FIGS. 1-5. Cartridge 10 has closed end 18 and open end 20 are illustrated in FIG. 2. Each side wall 14 has a lip 16 which extends substantially perpendicular from the wall and holds the ophthalmic lens package in place when the cartridge is held vertically. Lip 16 is one means of releasably holding the ophthalmic lens package to carrier, but there are other means such as flexible protrusions and the like that prevent the packages from falling out of the cartridge when the back wall 20 is vertical. It is preferred that each wall terminates in closed end 18, but not required. Each side wall 14 of FIG. 2, has three slits 22, which permit flexion of the wall to permit the discharge of an ophthalmic lens package in response to the pusher, (FIG. 4). These slits occur along the wall at intervals which corresponds to the length of an individual ophthalmic lens package. Round hole 12 and rectangular hole 13 extend through back wall 20. Cartridge 10 holds four such ophthalmic lens packages, laid end to end along back wall 20. It is preferred that cartridges hold at least two ophthalmic lens packages laid end to end along the back wall. A plurality of vertically oriented cartridges 10 *a-f* are illustrated in FIG. 3. Cartridges 10 *a, b, c, e*, and *f* (obscured by packages) contain four ophthalmic lens packages. Cartridge 10 *d* contains three ophthalmic lens packages 11. Round hole 12*d* and rectangular hole 13*d* are illustrated and there are three other such round holes and rectangular holes below the three packages.

FIG. 1 illustrates loader 31, base 30, first spool 32 and second spool 34, attached substantially perpendicular to base 30. One end of flexible sheet 36 is attached to a first spool 32 and the other end is attached to second spool 34. The height of flexible sheet 36 runs between base 30 and the top a spool and parallel to said spool. The width of flexible sheet 36 is substantially perpendicular to its height. A number of cartridges (obscured) are loaded with ophthalmic lens packages 38 and are attached to the flexible sheet 36. The first spool 32 and second spool 34 of FIG. 1 are connected to a bi-directional motor (not shown). This motor rotates spool 32 about a first axis and spool 34 about a second co-planar axis, in both instances with one degree of freedom. When the motor turns, flexible sheet 36 and its attached cartridges move horizontally in either direction and as illustrated in FIG. 1, the bulk of flexible sheet 36 and its attached cartridges coils around first spool 32. It is preferred that the width of the flexible sheet is greater than it's height, particularly, it is preferred that the width of the flexible sheet from the first end to the second end is greater than the co-planar distance between the spools. However, the width of the flexible sheet may be equal to its height or greater than its height.

FIG. 4 shows an exploded view of the one side of the apparatus. Flexible sheet 36 has a plurality of holes and plurality of cartridges 10 *a-e* attached to it. The holes 44 and 46 of the flexible sheet are aligned with the holes of the cartridges. It is preferred that there are as many holes in the flexible sheet as there are spaces in the cartridges for packages, however this is not required. For example, a single cartridge 10*c* of FIG. 4 holds a plurality of ophthalmic lens packages 38, aligned end to end in each cartridge. In this drawing the cartridges are substantially vertical and substantially parallel to Y axis of first spool 32 and second spool 34 and the open end of each cartridge illustrated, but not numbered, and the closed end which is substantially parallel to the base 30 (neither shown).

A pushing means 48 is a solenoid pusher which is mounted on posts 56*a* and 56*b*. Solenoid pusher is moved vertically along the Y axis and plunger 60 extends and retracts along the Z axis through hole 44 of flexible sheet 36 through the corresponding hole of the cartridge (not shown) to meet ophthalmic lens package 38. Aside from solenoid pusher 48, other pushing means include devices having a protrusion which responds to an electrical or mechanical signal to insert the protrusion through hole 44 of flexible sheet 36 through the cartridge to reach an ophthalmic lens contained in the cartridge. Alternatively such pushing means may be forced air (or other gas) which is aimed at hole 44 in response to an electrical or mechanical signal.

Scanning means 50 is a bar code reader is mounted on posts 56*a* and 56*b*. Bar code reader moves vertically along the Y axis and aligns with holes 46 of flexible sheet 36 through the corresponding hole of the cartridge (not shown) to read the coding on the back on the ophthalmic lens package.

In one method of using this device, ophthalmic lens packages having different prescriptions are randomly placed in loader 31. Each package contains a bar code whose location corresponds to hole 46 of the flexible sheet and the corresponding whole of the cartridge. Each package drops into a cartridge until said cartridges filled. Once a cartridge is filled the flexible sheet move to align another cartridge with loader 31. When the apparatus is loaded, inventory is taken by moving the flexible sheet along its width and moving scanner 50 to record the location of each ophthalmic lens. This information is sent to a computer (not shown) which stores the information locally, exports it to the manufacturer or the distributor for purposes of manufacturing product and monitoring consumption.

To retrieve a particular ophthalmic lens, the computer sends a signal to the pusher and the drive mechanism, instructing the flexible sheet to roll to the appropriate location. Once the correct ophthalmic lens is located, the pusher mechanically releases the ophthalmic lens and it drops towards the base for retrieval. The space created by delivery of the ophthalmic lens will be occupied by another ophthalmic lens that is loaded to the cartridge by the loader. Even though this embodiment illustrates the scanner and the pusher on the one side of the device, they may be on the other side of the device or on different sides of the device.

As used herein, "packages" refers to enclosures for articles. The preferred packages are packages for ophthalmic lenses. Ophthalmic lens packages include but are not limited to receptacle portion (commonly known as a blister bowl) and a cover which is sealed to the blister bowl that are used to house an individual ophthalmic lens. Examples of suitably shaped blister bowls are disclosed in the following documents which are hereby incorporated by reference in their entirety, U.S. Pat. Nos. D 458,023; 4,691,820; 5,054,610; 5,337,888; 5,375,698; 5,409,104; 5,467,868; 5,515,964; 5,609,246; 5,695,049; 5,697,495; 5,704,468; 5,711,416; 5,722,536; 5,573,108; 5,823,327; 5,704,468; 5,983,608; 6,029,808; 6,044,966; and 6,401,915. The receptacle portion of some ophthalmic lens packages is not bowl shaped. For purposes of this invention, the receptacles of those packages are included in the term blister bowl. Examples of such packages include but are not limited to ophthalmic lens packages disclosed in WO 2005/082721, U.S. Pat. No. 7,086,526, WO 03/016175, US 2004/0238380, and US 2008/0023345 which are hereby incorporated by reference in their entirety. Preferably, the cover is a flexible sheets made from adhesive laminates of an aluminum foil and extruded or co-extruded polymer film that can be sealed to the top surface of the blister bowl in order to form a hermetic seal for the ophthalmic lens. Examples of such materials are disclosed in the following publications, U.S. Pat. Pub. No. 2002/0197478; U.S. Pat. Nos. 6,090,471; 5,908,527; 5,656,362; 5,653,844; and 5,620,087, which are hereby incorporated by reference in their entirety.

As used herein "ophthalmic lens" refers to a device that resides in or on the eye. These devices can provide optical correction or may be cosmetic. Ophthalmic lenses include but are not limited to soft contact lenses and hard contact lenses. The preferred lenses of the invention are soft contact lenses are made from hydrogels and silicone elastomers, which include but are not limited to silicone hydrogels, and fluorohydrogels, particularly when such lenses are used are bifocal lenses, toric lenses, or other forms of custom lenses. Soft contact lens formulations are disclosed in U.S. Pat. No. 5,710,302, WO 9421698, EP 406161, JP 2000016905, U.S. Pat. No. 5,998,498, U.S. Pat. No. 6,087,415, U.S. Pat. No. 5,760,100, U.S. Pat. No. 5,776,999, U.S. Pat. No. 5,789,461, U.S. Pat. No. 5,849,811, and U.S. Pat. No. 5,965,631. The foregoing references are hereby incorporated by reference in their entirety. The particularly preferred ophthalmic lenses of the inventions are know by the United States Approved Names of etafilcon A, genfilcon A, lenefilcon A, lotrafilcon A, lotrafilcon B, balafilcon A, polymacon, bafilcon, acofilcon A acquafilcon A, alofilcon A alphafilcon A, amifilcon A, astifilcon A, atalafilcon A, bisfilcon A bufilcon A, crofilcon A, cyclofilcon A, darfilcon A deltafilcon A, deltafilcon B, dimefilcon A, drooxifilcon A, epsifilcon A, esterifilcon A, focofilcon A, galyfilcon A, govafilcon A, hefilcon A hefilcon B, hefilcon D, hilafilcon A, hilafilcon B, hixoifilcon A, hioxifilcon B, hioxifilcon C, hydrofilcon A, lenefilcon A, licryfilcon A, licryfilcon B, lidofilcon B, lidofilcon A, mafilcon A, mesifilcon A, methafilcon B, mipafilcon A, narafilcon A, nelfilcon A, netrafilcon A, ocufilcon A, ocufilcon B, ocufilcon C, ocufilcon D, ocufilcon E, ofilcon A, omafilcon A, oxyfilcon A, pentafilcon A, perfilcon A, pevafilcon A, phemfilcon A, senofilcon A, silafilcon A, siloxyfilcon A, tefilcon A, tetrafilcon A, trifilcon A, vifilcon A, or xylofilcon A. More particularly preferred ophthalmic lenses of the invention are genfilcon A, lenefilcon A, lotrafilcon A, lotrafilcon B, or balafilcon A. The most preferred lenses include but are not limited to galyfilcon, senofilcon A, etafilcon A, nelfilcon A, hilafilcon, and polymacon.

The flexible sheet may be any material, including but not limited to mylar, plastic, nylon to which said cartridges may be attached. Even though the flexible sheet is illustrated as a contiguous sheet with holes, it can be non-contiguous belts, chains and the like.

The spools may be made of any material, including but not limited to wood, metal, wire, plastic, nylons so long as the material may be rotatably mounted to the rotator means and connected to the support. It is preferred that the spools are made of rigid plastic. The cartridge may be made of polymers, nylon, or rubber. The preferred materials for the cartridges are polystyrene, polyvinyl chloride, ("ABS") acrylonitrile/butadiene/styrene, high molecular weight polypropylene, and high molecular weight polyethylene.

Further, the invention includes an apparatus for storing, and dispensing packages comprising a cartridge comprising a back wall, two side walls
  wherein said cartridge is sized to hold a package
  wherein said back wall comprises a hole
  wherein said side walls are substantially parallel to each other and are attached substantially perpendicular to said back wall
  wherein each of said side walls comprises a means for releasably holding the package in said cartridge
a first spool and a second spool
  wherein said first spool and said second spool are rotatably mounted to a least one support
  wherein said first spool rotates about a first axis with one degree of freedom and said second spool rotates about a second axis with one degree of freedom
  wherein said first axis and second axis are spaced a distance apart and are substantially co-planar
  wherein the rotation of each of said spools can be independently or dependently controlled by one or more rotator means
a continuous flexible sheet having a width, a height, and a hole
  wherein said width encircles said first and said second spool, and the space therebetween,
  wherein the back wall of said cartridge is attached to said flexible sheet,
  wherein the hole of the continuous flexible sheet and said one hole of the cartridge are aligned to permit an object to pass therethrough
a pushing means, wherein said pushing means moves in response to an electrical or mechanical signal, between said first spool and said second spool
  wherein said pushing means extends a pushing member through the hole of the flexible sheet and the hole in the back wall of the cartridge in response to an electrical or mechanical signal
a scanning means, wherein said scanning means moves in response to an electrical or mechanical signal between said first spool and said second spool.

Figure 5:
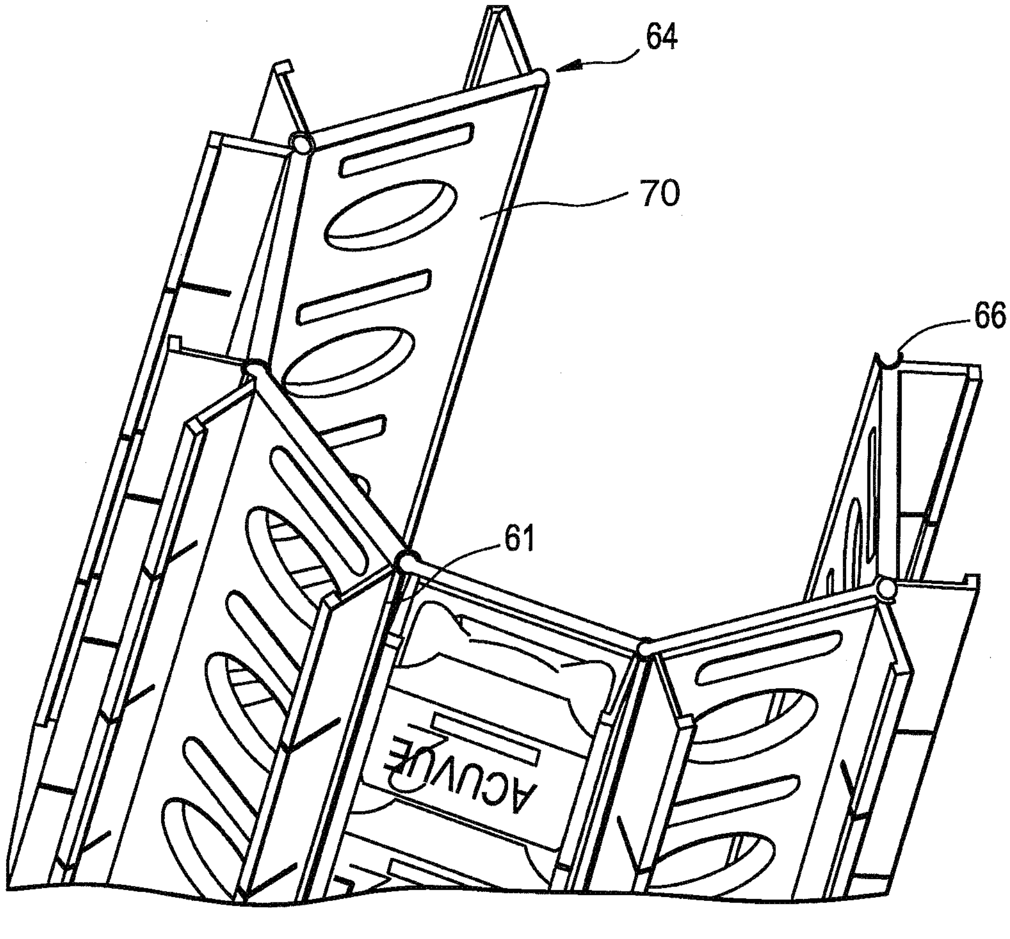
FIG. 5 Perspective view a plurality of attached cartridges

An alternative to the flexible sheet is illustrated by FIG. 5. Cartridges 60 are attached to each other by hinges 61 to form a plurality of cartridges. Alternative to the illustrated hinges include but are not limited to tape, mylar tabs, pressure fit connectors, living hinges and the like. First end 64 and second end 66 of this plurality may be attached to first spool and second spool respectively, or they may be attached to one another to form a continuous belt of cartridges which surround said spools.

Still further the invention includes an apparatus for storing, and dispensing packages comprising a plurality of cartridges each of said cartridges comprising a back wall,
two side walls,
  wherein each of said cartridges is sized to hold at least two packages laid end to end along its back wall
  wherein each of said cartridges comprises a back wall, two side walls, and attachment means to couple each of said cartridges to another cartridge at the intersection of one side wall and the back wall of one cartridge to one side wall and the back wall of another cartridge
  wherein said back wall comprises at least two holes
  wherein said side walls are substantially parallel to each other and are attached substantially perpendicular to said back wall
  wherein each of said side walls comprises a means for releasably holding the package in said cartridge
  wherein said plurality of cartridges encircles said first and second spools, and the space therebetween
a first spool and a second spool
  wherein said first spool and said second spool are rotatably mounted to a least one support
  wherein said first spool rotates about a first axis with one degree of freedom and said second spool rotates about a second axis with one degree of freedom
  wherein said first axis and second axis are spaced a distance apart and are substantially co-planar
  wherein the rotation of each of said spools can be independently or dependently controlled by one or more rotator means
a pushing means, wherein said pushing means moves in response to an electrical or mechanical signal, between said first spool and said second spool
  wherein said pushing means extends a pushing member through a hole of the flexible sheet and a hole in the back wall of the cartridge in response to an electrical or mechanical signal
a scanning means, wherein said scanning means moves in response to an electrical or mechanical signal between said first spool and said second spool.

Yet further still, the invention includes an apparatus for storing, and dispensing packages comprising a plurality of cartridges each of said cartridges comprising a back wall,
two side walls,
  wherein each of said cartridges is sized to hold at least two packages laid end to end along its back wall
  wherein each of said cartridges comprises a back wall, two side walls, and attachment means to couple each of said cartridges to another cartridge at the intersection of one side wall and the back wall of one cartridge to one side wall and the back wall of another cartridge
  wherein said back wall comprises at least two holes
  wherein said side walls are substantially parallel to each other and are attached substantially perpendicular to said back wall
  wherein each of said side walls comprises a means for releasably holding the package in said cartridge
  wherein said plurality of cartridges attached to each other by said attachment means comprises a first end, a second end, a width, and a height
  wherein the first end is attached along its height to the first spool via an attachment means and the second end is attached along its height to the second spool via an attachment means
  wherein said width is greater than the distance between said first and said second spool, along the base,
  wherein when said second spool rotates, said plurality of cartridges coils around said second spool and when said first spool rotates, said plurality of cartridges coils around said first spool
a first spool and a second spool wherein said first spool and said second spool are rotatably mounted to a least one support wherein said first spool rotates about a first axis with one degree of freedom and said second spool rotates about a second axis with one degree of freedom wherein said first axis and second axis are spaced a distance apart and are substantially co-planar wherein the rotation of each of said spools can be independently or dependently controlled by one or more rotator means a pushing means, wherein said pushing means moves in response to an electrical or mechanical signal, between said first spool and said second spool wherein said pushing means extends a pushing member through a hole of the flexible sheet and a hole in the back wall of the cartridge in response to an electrical or mechanical signal a scanning means, wherein said scanning means moves in response to an electrical or mechanical signal between said first spool and said second spool.

Even further still the invention includes an apparatus for storing, and dispensing packages comprising a plurality of cartridges wherein said each of said cartridges comprises a back wall, two side walls wherein said each of said cartridges is sized to hold at least two packages laid end to end along its back wall wherein said back wall comprises a hole wherein said side walls are substantially parallel to each other and are attached substantially perpendicular to said back wall wherein each of said side walls comprises a means for releasably holding the package in said cartridge a base comprising a first spool and a second spool spaced apart from one another on one surface of said base and rotatably mounted thereto wherein said first spool and said second spool are connected to one or more rotator means wherein the rotation of each of said spools can be independently controlled by said one or more rotator means a flexible sheet having a width, a height, a first end, a second end, and one hole wherein said width is greater than the distance between said first and said second spool, along the base, wherein the first end is attached along its height to the first spool and the second end is attached along its height to the second spool wherein when said second spool rotates, said flexible sheet coils around said second spool and when said first spool rotates, said flexible sheet coils around said first spool wherein the back wall of each of said cartridges is attached to said flexible sheet, the hole of the flexible sheet and the hole of each of said cartridge are aligned to permit an object to pass therethrough wherein the side walls of the cartridge are substantially parallel to the height of said flexible sheet a pushing means mounted on said base, wherein said pushing means traverses in response to an electrical or mechanical signal, in the same plane as said flexible sheet between said first spool and said second spool wherein said pushing means extends a pushing member through the holes of the flexible sheet and the hole in the back wall of the cartridge in response to an electrical or mechanical signal a scanning means mounted on said base, wherein said scanning means traverses in response to an electrical or mechanical signal in the same plane as said flexible sheet between said first spool and said second spool.

Even yet still further, an apparatus for storing, and dispensing packages comprising at least one cartridge wherein said cartridges comprises a back wall, two side walls wherein said cartridges is sized to hold at least two packages laid end to end along its back wall wherein said back wall comprises a hole wherein said side walls are substantially parallel to each other and are attached substantially perpendicular to said back wall wherein each of said side walls comprises a means for releasably holding the package in said cartridge a base comprising a first spool and a second spool spaced apart from one another on one surface of said base and rotatably mounted thereto wherein said first spool and said second spool are connected to one or more rotator means wherein the rotation of each of said spools can be independently controlled by said one or more rotator means a continuous flexible sheet having a width, a height, and one hole wherein said width encircles said first and said second spool, and the space therebetween, wherein the back wall of said cartridges is attached to said flexible sheet, the hole of the continuous flexible sheet and the hole of the cartridge are aligned to permit an object to pass therethrough wherein the side walls of the cartridge is substantially perpendicular to one surface of the base and substantially parallel to the height of said continuous flexible sheet a pushing means mounted on said base, wherein said pushing means traverses in response to an electrical or mechanical signal, in the same plane as said flexible sheet between said first spool and said second spool wherein said pushing means extends a pushing member through the hole of the continuous flexible sheet and the hole in the back wall of the cartridge in response to an electrical or mechanical signal a scanning means mounted on said base, wherein said scanning means traverses in response to an electrical or mechanical signal in the same plane as said flexible sheet between said first spool and said second spool.

This invention includes an apparatus for storing, and dispensing packages comprising a plurality of cartridges each of said cartridges comprising a back wall, two side walls, wherein each of said cartridges is sized to hold at least two packages laid end to end along its back wall wherein each of said cartridges comprises a back wall, two side walls, and attachment means to couple each of said cartridges to another cartridge at the intersection of one side wall and the back wall of one cartridge to one side wall and the back wall of another cartridge wherein said back wall comprises at least two holes wherein said side walls are substantially parallel to each other and are attached substantially perpendicular to said back wall wherein each of said side walls comprises a means for releasably holding the package in said cartridge a base comprising a first spool and a second spool spaced apart from one another on one surface of said base and rotatably mounted thereto wherein said first spool and said second spool are connected to one or more rotator means wherein the rotation of each of said spools can be independently controlled by said one or more rotator means wherein said plurality of cartridges encircles said first and said second spool, and the space therebetween, wherein the back walls of said plurality of cartridges are substantially parallel to said first and said second spool wherein the side walls of the cartridge is substantially perpendicular to one surface of the base a pushing means mounted on said base, wherein said pushing means traverses in response to an electrical or mechanical signal, in the same plane as the back walls of said plurality of cartridges between said first spool and said second spool a scanning means mounted on said base, wherein said scanning means traverses in response to an electrical or mechanical signal in the same plane as the back walls of said plurality of cartridges between said first spool and said second spool This invention includes an apparatus for storing, and dispensing packages comprising a plurality of cartridges each of said cartridges comprising a back wall, two side walls, wherein each of said cartridges is sized to hold at least two packages laid end to end along its back wall wherein each of said cartridges comprises a back wall, two side walls, and attachment means to couple each of said cartridges to another cartridge at the intersection of one side wall and the back wall of one cartridge to one side wall and the back wall of another cartridge wherein said back wall comprises at least two holes wherein said side walls are substantially parallel to each other and are attached substantially perpendicular to said back wall wherein each of said side walls comprises a means for releasably holding the package in said cartridge wherein said plurality of cartridges attached to each other by said attachment means comprises a first end a second end a width and a height wherein the first end is attached along its height to the first spool via an attachment means and the second end is attached along its height to the second spool via an attachment means wherein said width is greater than the distance between said first and said second spool, along the base, wherein when said second spool rotates, said plurality of cartridges coils around said second spool and when said first spool rotates, said plurality of cartridges coils around said first spool a base comprising a first spool and a second spool spaced apart from one another on one surface of said base and rotatably mounted thereto wherein said first spool and said second spool are connected to one or more rotator means wherein the rotation of each of said spools can be independently controlled by said one or more rotator means wherein the back walls of said plurality of cartridges are substantially parallel to said first and said second spool wherein the side walls of the cartridge is substantially perpendicular to one surface of the base a pushing means mounted on said base, wherein said pushing means traverses in response to an electrical or mechanical signal, in the same plane as the back walls of said plurality of cartridges between said first spool and said second spool a scanning means mounted on said base, wherein said scanning means traverses in response to an electrical or mechanical signal in the same plane as the back walls of said plurality of cartridges between said first spool and said second spool.

In addition to the aforementioned apparatuses, the invention includes methods of storing and ophthalmic lenses in any of the apparatuses of the invention. For example the invention includes a method of dispensing or storing packages comprising storing or dispensing such packages from an apparatus comprising a cartridge comprising a back wall and two side walls wherein said cartridge is sized to hold a package wherein said back wall comprises a hole wherein said side walls are substantially parallel to each other and are attached substantially perpendicular to said back wall wherein each of said side walls comprises a means for releasably holding the package in said cartridge a first spool and a second spool wherein said first spool and said second spool are rotatably mounted to a least one support wherein said first spool rotates about a first axis with one degree of freedom and said second spool rotates about a second axis with one degree of freedom wherein said first axis and second axis are spaced a distance apart and are substantially co-planar wherein the rotation of each of said spools can be independently or dependently controlled by one or more rotator means a flexible sheet having a width, a height, a first end, a second end, and a hole wherein the first end is attached along its height to the first spool and the second end is attached along its height to the second spool wherein when said second spool or said first spool rotate, said flexible sheet coils or uncoils around said spools in response to their rotation wherein the back wall of said cartridge is attached to said flexible sheet, and the hole of the flexible sheet and the hole of the cartridge are aligned to permit an object to pass therethrough a pushing means, wherein said pushing means moves in response to an electrical or mechanical signal, between said first spool and said second spool wherein said pushing means extends a pushing member through the hole of the flexible sheet and the hole in the back wall of the cartridge in response to an electrical or mechanical signal a scanning means, wherein said scanning means moves in response to an electrical or mechanical signal between said first spool and said second spool.

The advantages of the apparatuses and methods of the invention are numerous. Aside from the ability to track which lenses are dispensed at a particular time to a particular location, and to deliver such information to the manufacturer or the dispensing ophthalmic professional, the apparatus may be fitted with a printer to directly print the patient's contact information for mailing or other types of delivery to the patient. Still further, the apparatus can be placed in a retail establishment and so that patients as well as ophthalmic may use the apparatus to dispense ophthalmic lenses.

The aforementioned embodiments of the invention are meant to illustrate the invention and suggest methods and devices that embody the invention. In addition to the embodiments enclosed herein, U.S. Ser. No. 61/171,593 filed on Apr. 22, 2009 and its non-provisional counterpart filed on Dec. 16, 2009, which are both incorporated by reference for the disclosures contained therein, contain embodiments of certain aspects of this invention. Those knowledgeable in the production three-dimensional objects as well as other specialties may find other methods of practicing the invention. However, those methods are deemed to be within the scope of this invention.

What is claimed is:

1. An apparatus for storing, and dispensing packages comprising:
- a cartridge comprising a back wall and two side walls,
  - wherein said cartridge is sized to hold a package,
  - wherein said back wall comprises a first hole,
  - wherein said side walls are substantially parallel to each other and attached substantially perpendicular to said back wall, and
  - wherein each of said side walls comprises a means for releasably holding the package in said cartridge;
  - a first spool and a second spool,
  - wherein said first and second spools are rotatably mounted to a least one support,
  - wherein said first spool rotates about a first axis with one degree of freedom and said second spool rotates about a second axis with one degree of freedom,
  - wherein said first axis and second axis are spaced a distance apart and are substantially co-planar, and
  - wherein the rotation of each of said first and second spools can be controlled by one or more rotator means,
- a continuous flexible sheet having a width, a height and a first hole formed therein,
  - wherein said flexible sheet encircles said first and second spools and the space therebetween,
  - wherein the back wall of said cartridge is attached to said flexible sheet, and
  - wherein the first hole in the continuous flexible sheet and said first hole in the back wall of said cartridge are aligned to permit an object to pass therethrough,
  - a pushing means,
  - wherein said pushing means extends a pushing member through the first hole of the flexible sheet and the first hole in the back wall of the cartridge in response to an electrical signal from a computer; and
- a scanning means.

2. The apparatus of claim 1, wherein the scanning means and the pushing means are on the same side of the flexible sheet.

3. The apparatus of claim 1, wherein the package is an ophthalmic lens package.

4. The apparatus of claim 1, wherein the back wall of the cartridge comprises a second hole;
- wherein the continuous flexible sheet comprises a second hole; and
- wherein the scanning means is aligned with the second hole in the back wall of the cartridge and the second hole in the continuous flexible sheet.

5. The apparatus of claim 1, further comprising a base with the first and second spools mounted thereto and housing the one or more rotator means.

6. The apparatus of claim 1, further comprising a loader configured to reside above the cartridge and having a size and shape configured to receive ophthalmic lens packages.

7. The apparatus of claim 1, wherein the computer controls the rotator means.

* * * * *